US006585159B1

(12) United States Patent
Meier et al.

(10) Patent No.: US 6,585,159 B1
(45) Date of Patent: Jul. 1, 2003

(54) INDICIA SENSOR SYSTEM FOR OPTICAL READER

(75) Inventors: Timothy P. Meier, Marcelllus, NY (US); Robert M. Hussey, Camillus, NY (US); Charles P. Barber, Fayetteville, NY (US)

(73) Assignee: Welch Allyn Data Collection, Inc., Skaneateles Falls, NY (US)

( * ) Notice: Subject to any disclaimer, the term of this patent is extended or adjusted under 35 U.S.C. 154(b) by 0 days.

(21) Appl. No.: 09/432,282

(22) Filed: Nov. 2, 1999

(51) Int. Cl.[7] ............................................. G06K 7/10
(52) U.S. Cl. ............................ 235/462.31; 235/462.08; 235/462.14; 235/462.16; 235/462.25; 235/462.2
(58) Field of Search ..................... 235/462.31, 462.25, 235/462.14, 462.05, 462.08, 462.16, 462.2

(56) References Cited

U.S. PATENT DOCUMENTS

| | | | | |
|---|---|---|---|---|
| 5,288,976 A | * | 2/1994 | Citron et al. ................ | 235/375 |
| 5,550,366 A | * | 8/1996 | Ruostaei .................... | 235/462 |
| 5,818,023 A | * | 10/1998 | Meyerson et al. ......... | 235/462 |
| 5,902,987 A | * | 5/1999 | Coffman et al. ........ | 235/462.12 |
| 6,005,683 A | * | 12/1999 | Son et al. .................... | 358/488 |
| 6,176,429 B1 | * | 1/2001 | Reddersen et al. ..... | 235/462.25 |
| 6,206,287 B1 | * | 3/2001 | Wasula et al. .......... | 235/462.05 |

FOREIGN PATENT DOCUMENTS

WO    WO009923598 A1  *  5/1999

* cited by examiner

*Primary Examiner*—Karl D. Frech
*Assistant Examiner*—Daniel Walsh
(74) *Attorney, Agent, or Firm*—Wall Marjama & Bilinski LLP

(57) ABSTRACT

In the present invention, the control unit of an optical reader analyzes image data being generated by the imaging element of the reader and changes the mode of operation of the reader if the image data indicates that machine readable indicia, such as a bar code symbol or a text character, is likely in the field of view of the reader. Normally, analysis of image data includes the step of detecting for edge transitions in the image information. If the control unit determines that the image data includes more than a predetermined number of edge transitions, then the control unit imparts appropriate control over various reader elements to change the mode of operation of the reader. Normally, the control unit changes the mode of operation of the reader from a first mode, wherein the reader does not operate to decode or recognize image data to a second mode, wherein the reader operates to decode and/or recognize image data.

71 Claims, 8 Drawing Sheets

INDICIA SENSOR SYSTEM FOR OPTICAL READER

BACKGROUND OF THE INVENTION

1. Field of the Invention

The present invention relates to optical readers in general and particularly to an optical reader configured to change operating modes depending on characteristics of images in the reader's field of view.

2. Background of the Prior Art

Prior art optical readers are sometimes configured to operate in a "continuous scan model" so that bar code symbols and other indicia presented to the reader are automatically decoded or otherwise recognized without manually activating a control element such as a trigger to commence indicia recognizing activities.

A continuous scan operating configuration requires repetitive illumination flashing of an LED array in the case of an image sensor based optical reader and repetitive laser scanning in the case of a laser scan engine based optical reader. Repetitive flashing illumination or laser scanning requires a high level of energy consumption and can result in premature component degradation. Furthermore, the repetitive illumination or laser scanning has been observed to be highly distracting to users of such optical readers configured to continuously scan image data.

U.S. Pat. No. 5,550,366 describes a system for automatically activating image scanning in a portable bar code reader when the presence of a bar code in a target area is detected. However, the detection of a bar code in the target area is carried out on a period basis and requires for the detection activation of a high radiance source of illumination. Accordingly, the system is not responsive in real time to an object being moved into the field of view of the reader, and the high radiance illumination required for operation of the system remains a source of distraction.

There is a need for an optical reader which is configured to automatically and in real time decode or otherwise recognize machine readable indicia that is presented to the reader without manual activation of a control element to commence recognition operations.

SUMMARY OF THE INVENTION

According to its major aspects and broadly stated, the invention is a method for operating an optical reader so that control of the reader depends on image information being generated by the optical imaging element, such as an image sensor, of the reader.

In one embodiment, the reader control unit analyzes image information being generated by the imaging element and changes the mode of operation of the reader if the image information indicates that machine readable indicia, such as bar code symbols or a text character, is in the field of view of the reader. Normally, analysis of image data includes the step of detecting for edges, or edge transitions in the image information. If the control unit determines that the image information includes more than a predetermined number of edge transitions, then the control unit imparts appropriate control over various reader elements to change the mode of operation to the reader.

When the control unit determines that machine readable indicia is in the field of view of the imaging element then the control unit may change the mode of operation of the reader from a first mode, wherein the reader does not operate to decode or otherwise recognize machine readable indicia to a second mode, wherein the reader actively attempts to decode or otherwise recognize machine readable indicia. The second mode may be characterized, for example, by an increased illumination of the field of view, and/or by the activation or enhancement of decoding algorithms being operated to process captured image data and/or by the activation or enhancement of optical character recognition (OCR) algorithms being operated to process captured image data.

The method may be utilized with any type of optical reader, including a basic hand held bar code reader, a multi functional data collection unit having a keyboard, display, and imaging element, a scan stand optical reader, or a fixed mount optical reader mounted to generate image information corresponding to articles which are manually or automatically moved across a point of transaction.

The method may be utilized with an optical reader to supplement or replace the function normally provided by a trigger switch. In most hand held optical readers a trigger switch is manually depressed to commence decoding or recognition operations of the reader. An optical reader programmed in accordance with the invention may commence decoding and/or recognition operations automatically upon the detection of machine readable indicia in the field of view of the reader without a trigger being depressed.

These and other details, advantages and benefits of the present invention will become apparent from the detailed description of the preferred embodiment herein below.

BRIEF DESCRIPTION OF THE DRAWINGS

The preferred embodiment of the invention will now be described, by way of example only, with reference to the accompanying Figures wherein like members bear like reference numerals and wherein.

DETAILED DESCRIPTION OF THE PREFERRED EMBODIMENT

A block diagram illustrating one type of optical reading device in which the invention may be incorporated is described with reference to FIG. 1.

Optical reader 10 includes an illumination assembly 20 for illuminating a target object T, such as a 1D or 2D bar code symbol, and an imaging assembly 30 for receiving an image of object T and generating an electrical output signal indicative of the data optically encoded therein. Illumination assembly 20 may, for example, include an illumination source assembly 22, such as one or more LEDs, together with an illuminating optics assembly 24, such as one or more reflectors, for directing light from light source 22 in the direction of target object T. Illumination assembly 20 may be eliminated if ambient light levels are certain to be high enough to allow high quality images of object T to be taken. Imaging assembly 30 may include an image sensor 32, such as a 1D or 2D CCD, CMOS, NMOS, PMOS, CID or CMD solid state image sensor, together with an imaging optics assembly 34 for receiving and focusing an image of object T onto image sensor 32. The array-based imaging assembly shown in FIG. 1 may be replaced by a laser scanning based imaging assembly comprising a laser source, a scanning mechanism, emit and receive optics, a photodetector and accompanying signal processing circuitry.

Figure 1:
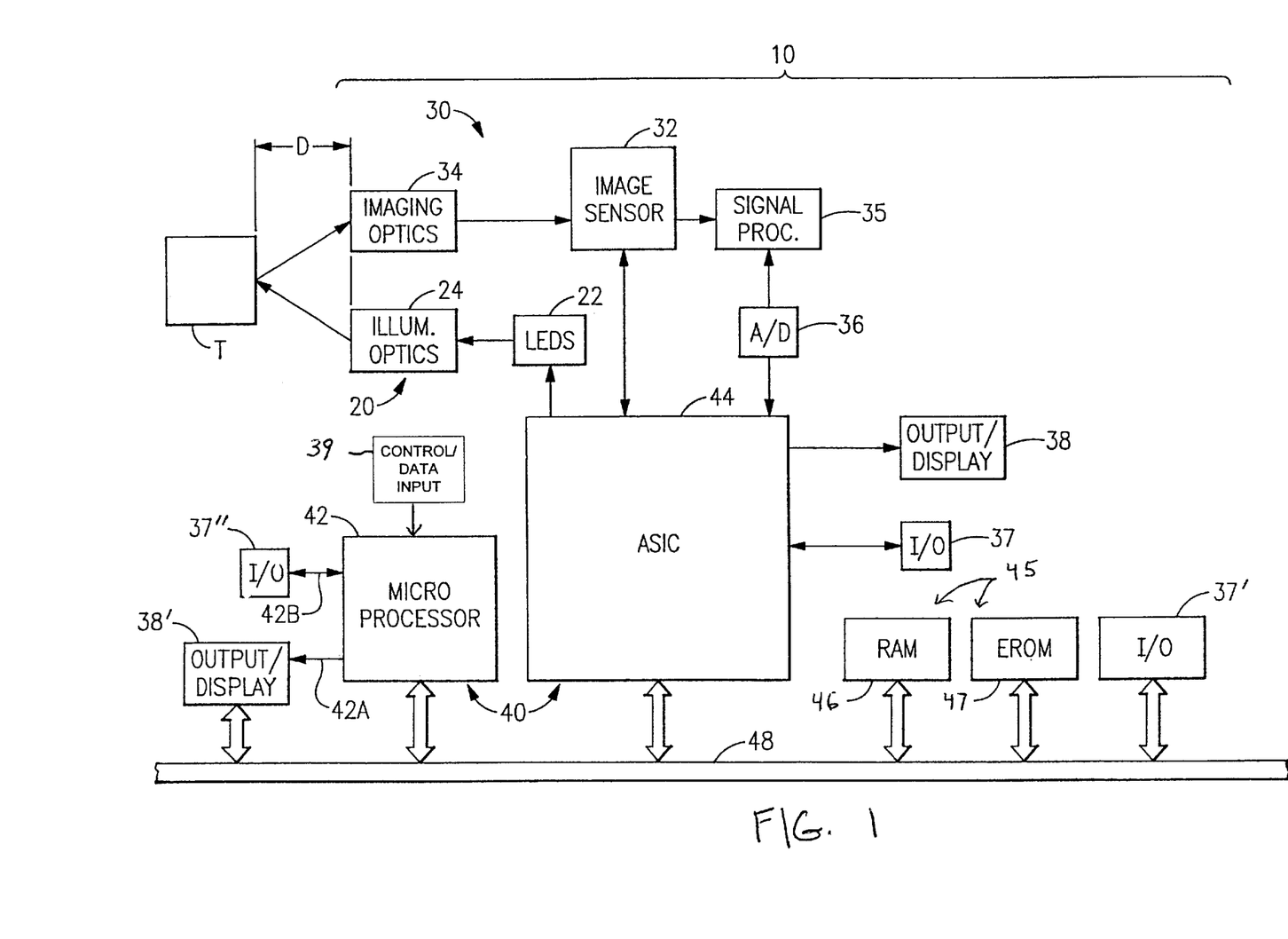
FIG. 1 is a block electrical diagram of an exemplary optical reading device in which the invention may be incorporated.

Optical reader 10 of FIG. 1 also includes programmable control unit 40 which preferably comprises an integrated circuit microprocessor 42 and an application specific integrated circuit or ASIC 44. Processor 42 and ASIC 44 are both programmable control devices which are able to receive, output and process data in accordance with a stored program stored in memory unit 45 which may comprise such memory elements as a read/write random access memory or RAM 46 and an erasable read only memory or EROM 47. RAM 46 typically includes at least one volatile memory device but may include one or more long term non-volatile memory devices. Processor 42 and ASIC 44 are also both connected to a common bus 48 through which program data and working data, including address data, may be received and transmitted in either direction to any circuitry that is also connected thereto. Processor 42 and ASIC 44 differ from one another, however, in how they are made and how they are used.

More particularly, processor 42 is preferably a general purpose, off-the-shelf VLSI integrated circuit microprocessor which has overall control of the circuitry of FIG. 2, but which devotes most of its time to decoding image data stored in RAM 46 in accordance with program data stored in EROM 47. Processor 44, on the other hand, is preferably a special purpose VLSI integrated circuit, such as a programmable logic or gate array, which is programmed to devote its time to functions other than decoding image data, and thereby relieve processor 42 from the burden of performing these functions.

The actual division of labor between processors 42 and 44 will naturally depend on the type of off-the-shelf microprocessors that are available, the type of image sensor which is used, the rate at which image data is output by imaging assembly 30, etc. There is nothing in principle, however, that requires that any particular division of labor be made between processors 42 and 44, or even that such a division be made at all. This is because special purpose processor 44 may be eliminated entirely if general purpose processor 42 is fast enough and powerful enough to perform all of the functions contemplated by the present invention. It will, therefore, be understood that neither the number of processors used, nor the division of labor therebetween, is of any fundamental significance for purposes of the present invention.

With processor architectures of the type shown in FIG. 1, a typical division of labor between processors 42 and 44 will be as follows. Processor 42 is preferably devoted primarily to the tasks of decoding image data, once such data has been stored in RAM 46, handling menuing options and reprogramming functions, processing commands and data received from control/data input unit 39 which may comprise such elements as trigger 74 and keyboard 78 and providing overall system level coordination. Processor 44 is preferably devoted primarily to controlling the image acquisition process, the A/D conversion process and the storage of image data, including the ability to access memories 46 and 47 via a DMA channel. Processor 44 may also perform many timing and communication operations. Processor 44 may, for example, control the illumination of LEDs 22, the timing of image sensor 32 and an analog-to-digital (A/D) converter 36, the transmission and reception of data to and from a processor external to reader 10, through an RS-232, a network, or a serial bus such as USB, (or other) compatible I/O interface 37 and the outputting of user perceptible data via an output device 38, such as a beeper, a good read LED and/or a display monitor which may be provided by a liquid crystal display such as display 82. In the alternative, given that off-the-shelf microprocessors having built-in serial interfaces and display controllers are now available, it may be convenient to configure processor 42 to control output, display and I/O functions. Control of output, display and I/O functions may also be shared between processors 42 and 44, as suggested by bus driver I/O and output/display devices 37' and 38' or may be duplicated, as suggested by microprocessor serial I/O ports 42A and 42B and I/O and display devices 37" and 38'. As explained earlier, the specifics of this division of labor is of no significance to the present invention.

Figures 2A, 2B:
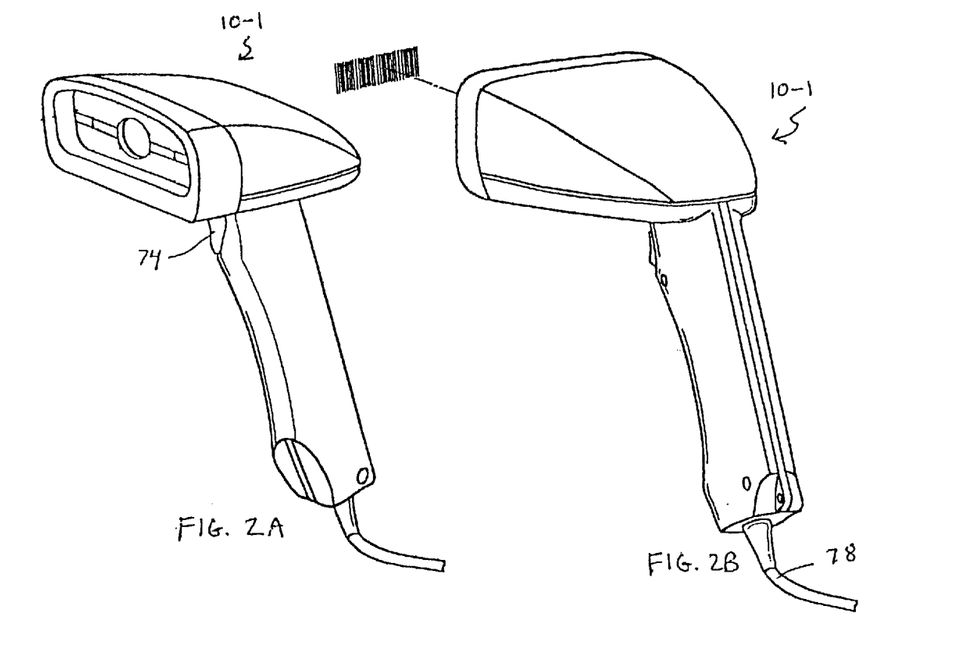
FIGS. 2A–2H show perspective views of exemplary optical readers in which the invention may be incorporated.
Figures 2C, 2D:
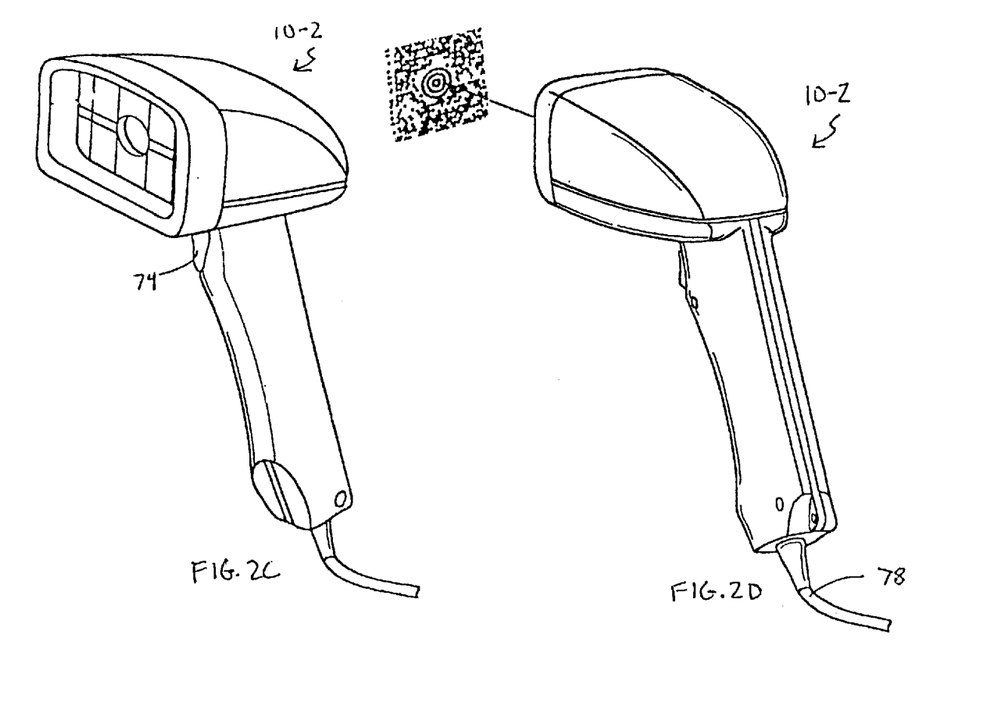
Figure 2E:
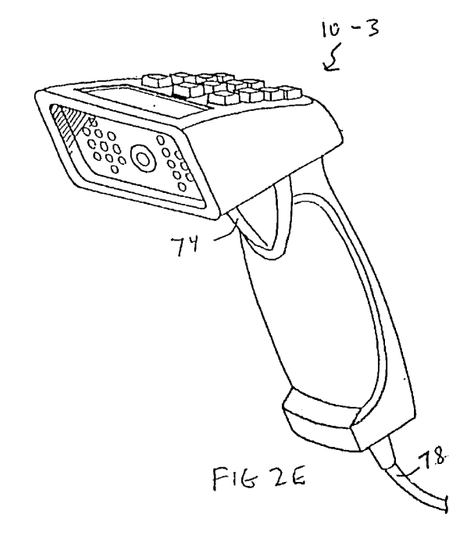
Figure 2F:
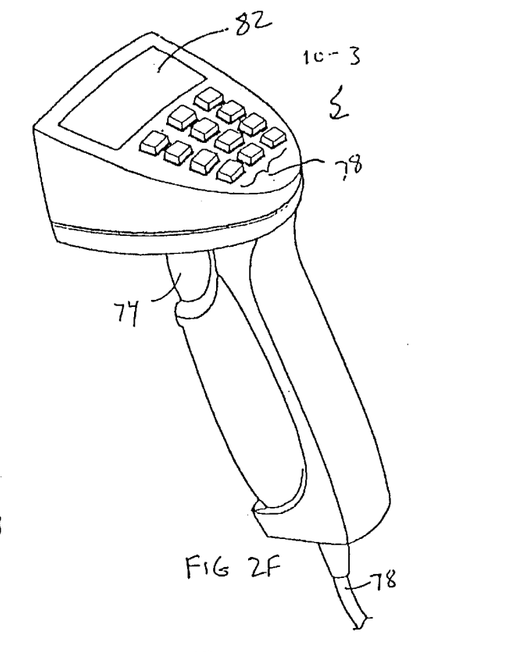

FIGS. 2A through 2H show examples of types of housings in which the present invention may be incorporated. FIGS. 2A and 2B show a 1D optical reader 10-1, while FIGS. 2C–2H show 2D optical readers 10-2, 10-3, 10-4. Housing 12 of each of the optical readers 10-1 through 10-4 is adapted to be graspable by a human hand and has incorporated therein at least one trigger switch 74 for activating image capture and decoding and/or image capture and character recognition operations. Readers 10-1, 10-2, 10-3 include hard-wired communication links 78 for communication with external devices such as other data collection devices or a host processor, while reader 10-4 includes an antenna 80 for providing wireless communication with an external device such as another data collection device or a host processor.

Figure 2G:
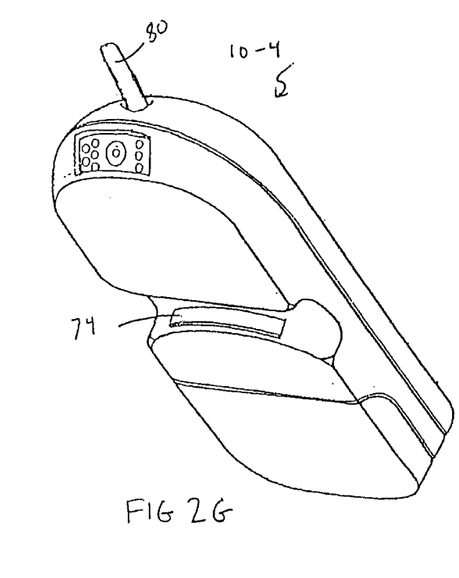
Figure 2H:
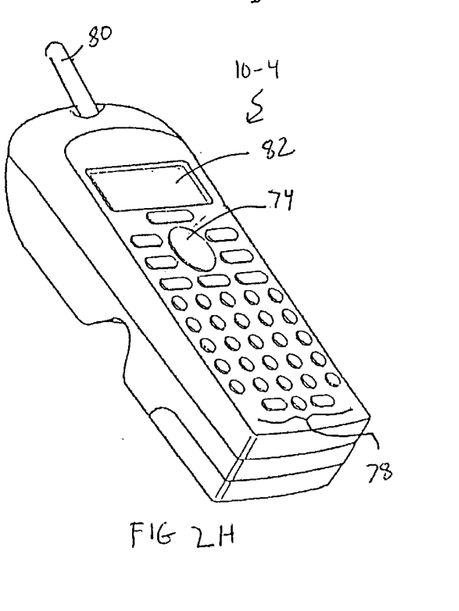

In addition to the above elements, reader 10-3 and 10-4 each include a display 82 for displaying information to a user and a keyboard 78 for enabling a user to input commands and data into the reader.

Figure 2I:
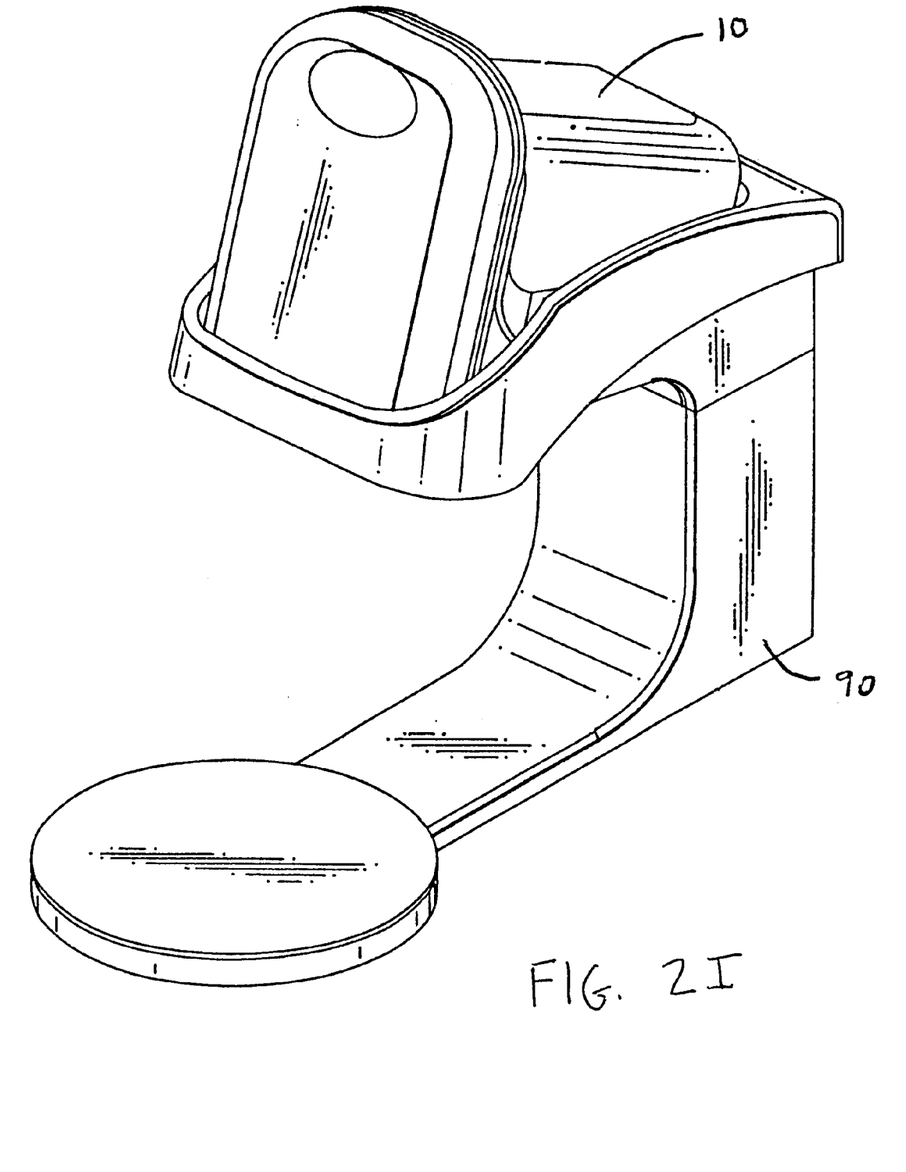
FIG. 2I shows an example optical reader of the type in which the invention may be incorporated stationed in a scan stand.

Any one of the readers described with reference to FIGS. 2A through 2H may be mounted in a stationary position as is illustrated in FIG. 2I showing a generic optical reader 10 docked in a scan stand 90. Scan stand 90 adapts portable optical reader 10 for presentation mode scanning. In a presentation mode, reader 10 is held in a stationary position and an indicia bearing article is moved across the field of view of reader 10.

As will become clear from the ensuing description, the invention need not be incorporated in a portable optical reader. The invention may also be incorporated, for example, in association with a control unit for controlling a non-portable fixed mount imaging assembly that captures image data representing image information formed on articles transported by an assembly line, or manually transported across a checkout counter at a retail point of sale location.

Figure 3:
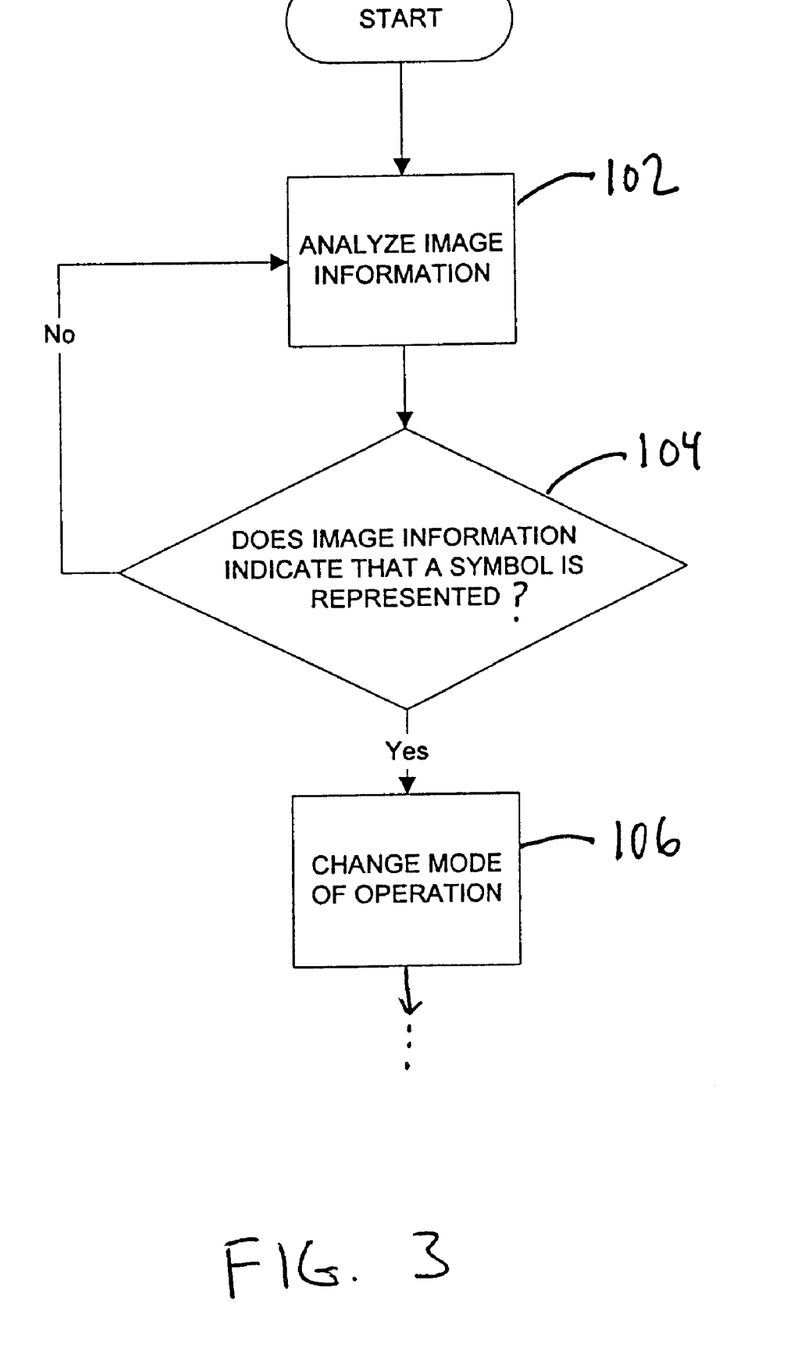
FIG. 3 is a flow diagram illustrating operations which may be performed by an optical reading device during execution of the invention.

Now referring to particular aspects of the invention, a high level flow diagram illustrating operation of an optical reader configured to operate in accordance with the invention is shown in FIG. 3. At block 102 control unit 40 analyzes image information that is generated by the reader's imaging assembly. At block 104 control unit 40 determines if a machine readable indicia is likely represented in the image information, and if the unit 40 at block 104 determines that a machine recognized indicia is likely contained in the image information then the unit at block 106 changes the mode of operation of the reading device.

Preferred implementations of each of these steps will now be described in detail. While the analysis of image information (block 102) could be carried out by processing of analog image signals produced by sensor array 32, or by a photo detector in the case the imaging assembly is laser based, the analysis of image information is preferably carried out by processing of pixel image data captured by control unit 40. In the control system of FIG. 1, control unit 40 captures image data by repeatedly reading the output from A/D converter 35 and writing these data into RAM 46. As indicated by the control system depicted in FIG. 1, image sensor 32 presents an output to signal processing block 35 which presents an output to AID converter 36.

Control unit 40 may detect for the presence of machine readable indicia in captured image data by detecting for edge transitions or edges in the image data. An edge of an image is an area of contrast between a darker indicia and lighter indicia. A plain uniformly reflecting substrate can be expected to have substantially no human recognizable edge transitions. A substrate having a bar code symbol formed thereon, however, can be expected to have several edge transitions because each interface between a space and a dark area of a symbol constitutes an edge. Substrates having machine readable text characters formed thereon can also be expected to have several edge transitions. In one implementation of the invention, control unit 40 determines that a frame of image data captured by an imaging system is likely to contain machine recognizable indicia if the scene contains more than a predetermined number of edge transitions.

The preferred number of predetermined edge transitions that is selected to indicate the likely presence of machine readable indicia in a captured frame of image data may vary within a wide range (from about 3 to 50 or more) depending on such factors as the characteristics of machine readable indicia which are to be subject to image capture, and on characteristics of the image capturing process. The selection of a relatively small number of edge transitions (such as between about 5 and 15) as the predetermined threshold number of edges indicating the likely presence of machine readable indicia is useful in the case a reading device according to the invention is configured to detect for the presence of bar code symbols having 50 or more edge transitions formed on a substrate that is moving relative to a reading device during image capture. Selecting a number of edge transitions substantially less than the actual number of edge transitions expected to be found in a still captured image aids in the detection of machine readable indicia in captured images that are blurred as a result of a substrate and/or reader being moved during the image capture process.

In an alternative implementation of the invention, control unit 40 determines that a captured scene likely contains machine recognizable indicia if the number of edge transitions represented in captured frames of image data changes by more than a predetermined amount over the course of one or more consecutively captured frames. Such an implementation is useful, for example, where control unit 40 is employed to capture images from scenes having backgrounds known to have a high number of edges (wood grain surfaces, for example). In one specific example of this type of implementation, control unit 40 can be configured to determine that a first frame is not likely to contain machine recognizable indicia if the frame has edge transitions numbering within an "equilibrium" range number of edge transitions and to determine that a next frame is likely to contain machine recognizable indicia if the next frame contains a number of edge transitions that differs from that of the previous frame by a predetermined amount.

Control unit 40 may detect edge transitions in captured image data in a variety of ways. In one method for edge detection, control unit 40 analyzes a line of image data to determine if a captured image includes an edge or edges. Control unit 40 may detect edges in a captured image by establishing at least one threshold in a line of image data and recording an edge detection each time the line image data crosses the threshold. In one embodiment of the invention, the at least one threshold may be established based on the average pixel value or on a function of the average pixel value of the line of image data.

If control unit 40 captures image data from a 1×N 1D image sensor then the line of image or pixel data analyzed by control unit 40 comprises image data generated from the row of pixels of the linear pixel array. If control unit 40 captures image data from a 1D laser scanning assembly then the line of image data analyzed by control unit 40 comprises image data corresponding to a line sweep of a laser scanner. If control unit 40 captures image data from a 2D image sensor then the line of image data analyzed by control unit 40 may comprise any line grouping of pixels from the initial captured bit map. The line of pixel values analyzed by control unit 40 may comprise, for example, pixel data one or more pixels wide corresponding to a vertical, horizontal, diagonal linear row of pixels from the sensor array. The line of pixels need not be linear, however. For example, the line of pixels analyzed by control unit 40 may comprise an arcuate or jagged grouping of pixels from a captured bit map. Furthermore, control unit 40 need not analyze every pixel from a selected line. For example it may be beneficial to ignore pixels (such as every other pixel) in a given line in the interest of increasing processing speed. The line of pixel data analyzed by control unit 40 normally comprises pixel data captured in an initial bit map. It will be understood, however, that a pixel value of a line of image data in accordance with the invention may not be an actual pixel value from an initial bit map, but a representative pixel value determined, for example, based on the values of a grouping of positionally related pixels of an initial bit map.

Figure 4:
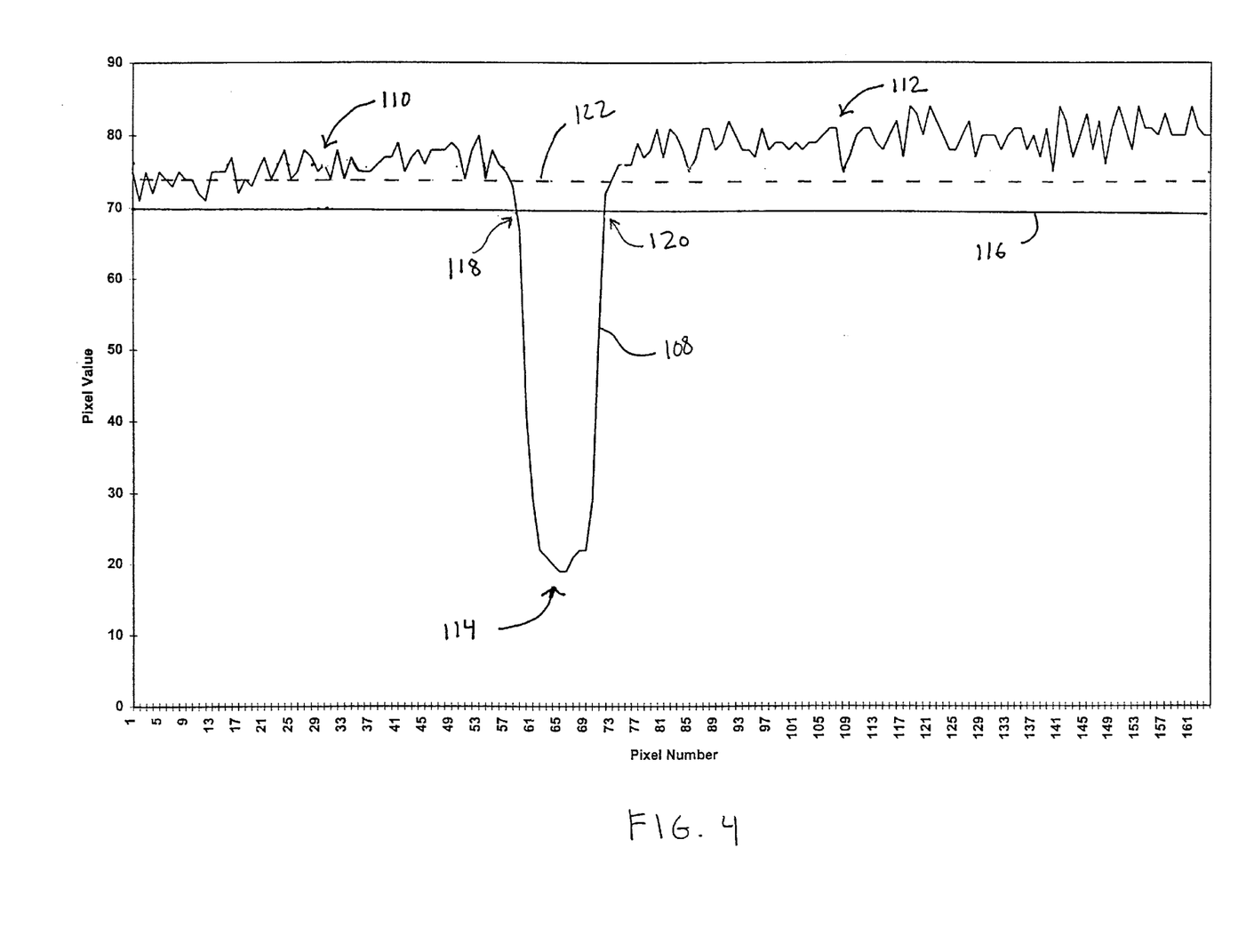
FIG. 4 is a pixel diagram corresponding to a single bar symbol illustrating one possible variation of the edge detection method of the invention.

FIG. 4 shows pixel data 108 that corresponds to a scene having a single bar symbol. The regions of higher pixel intensity 110 and 112 correspond to space while the region of lower pixel intensity 114 corresponds to the bar. It is seen by threshold 116 that a single threshold may successfully aid in the detection of edge transitions of a scene, If edges are detected for based on pixel data crossings of threshold 116, then threshold 116 will result in the recording of two edge transitions 118 and 120, which is the correct number for a scene having a single bar. However, it is seen by threshold 122 that if threshold 122 is in a range of pixel values about which pixel values may fluctuate due to noise, that detecting for edges using a single threshold may yield erroneous detections of edge transitions.

Threshold 122 also illustrates other potential problems which may arise with use of a constant valued threshold. In the case that a scene is illuminated non-uniformly, or if indicia is formed on substrate non-uniformly, use of a constant threshold for determining edge transitions can yield inconsistent edge detections of image data corresponding to similar indicia. It is seen that although region 110 and region 112 both correspond to a white substrate, they are illuminated slightly non-uniformly and therefore application of constant threshold 122 would result in edges being detected for in region 110 and not being detected in region 112.

Figure 5:
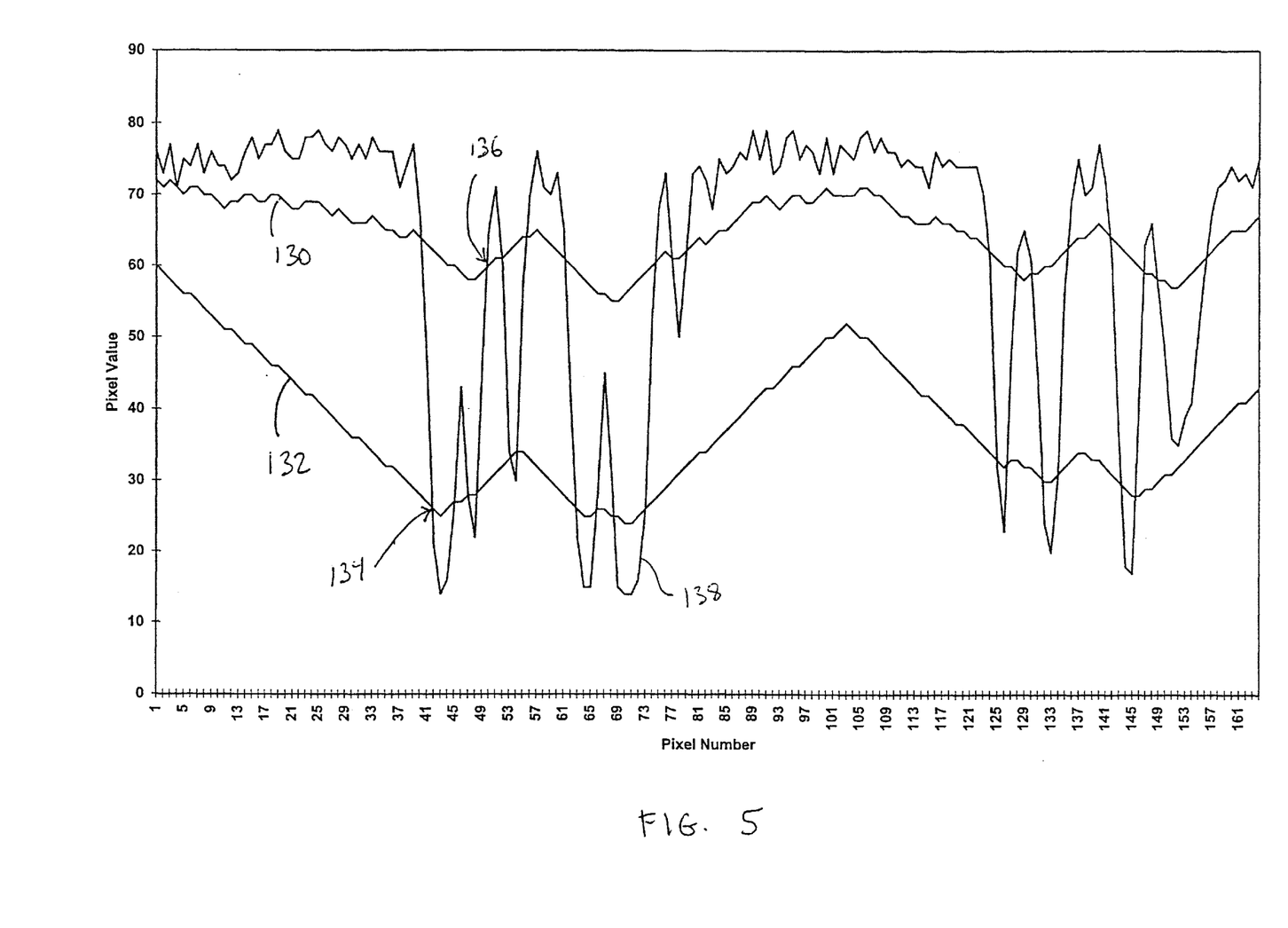
FIG. 5 is a pixel diagram corresponding to a multiple bar symbol illustrating a second possible variation of an edge detection method of the invention.

Accordingly, in view of the potential problems involved with the use of a single, constant threshold, it may be beneficial to detect for edges in row of pixel image data utilizing a plurality of "adaptive" thresholds. FIG. 5 illustrates thresholding edge detection method utilizing two "adaptive" thresholds, an adaptive maximum threshold 130 and an adaptive minimum threshold 132.

In an adaptive threshold, the threshold at any one pixel may be a function of the values of pixels in proximity with that pixel. Although the adaptive threshold method increases the processing load and computation time, use of adaptive threshold or thresholds enables an edge detection method, according to the invention, to accurately record edge transitions in the case there is a non-uniform illumination of a scene or in the case that dark regions of machine readable indicia are formed on a substrate non-uniformly. In the specific example of FIG. 5, the maximum threshold 130 is established at a predetermined percent (such as an 80 percent level) of a tracking line, which tracks local maximum points of the row of pixel data 138 with a provision that results in local maximum points being bypassed if a local maximum point is significantly lower than neighboring local maximum points. The minimum threshold 130, meanwhile, is established at a predetermined percent value (such as 20 percent above) of a minimum tracking line, which is established by tracking local minimum points of the row of pixel data 138 with the provision that results in local minimum points that are significantly higher than neighboring local minimum points being bypassed. Edge transitions in the example of FIG. 5 are recorded when the pixel data 138 falls below the minimum threshold 132, e.g., point 134, and when the pixel data rises above maximum threshold 130, e.g. point 136.

Figure 6:
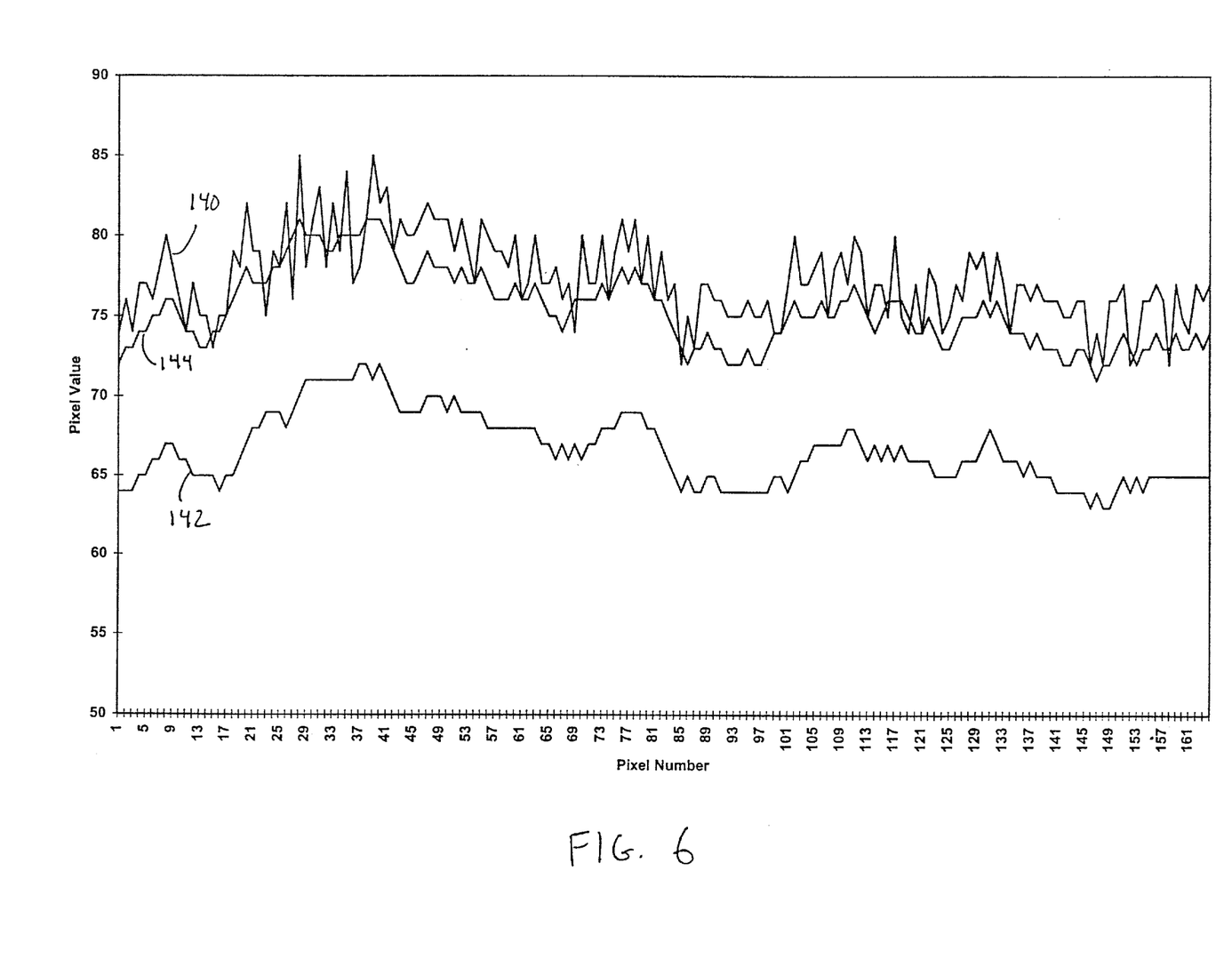
FIG. 6 is a pixel diagram corresponding to a substantially uniform white sheet of paper illustrating a third possible variation of an edge detection method of the invention.

FIG. 4 shows pixel data corresponding to a single bar in a scene, FIG. 5 shows pixel data corresponding to a machine readable symbol, while FIG. 6 shows pixel data corresponding to a white sheet of paper. In the example of FIG. 4 corresponding to a single bar, the edge detection method utilizing threshold 120 will record two edges, which according to the invention is not normally a sufficient number of edges to constitute the detection of a machine readable indicia. Normally, the reader is programmed so that a substantial number of edges (normally at least three) are required to constitute the detection of a machine readable indicia. In the example of FIG. 5 corresponding to a machine readable indicia then application of an edge detection method results in sixteen (16) edges being detected. This is normally sufficient to constitute the detection of a machine readable indicia.

In the edge detection methods described thus far with reference to FIGS. 4 and 5, the detection of edges depends only on whether there is detectable fluctuation of pixel image data and not on the magnitude of the fluctuation. Accordingly, as the edge detection method has been described thus far, application of the method may result in edges being detected from image data corresponding to a substantially uniform gray scale scene. It can be observed from the example of FIG. 6 illustrating a row 140 of pixel data corresponding to a substantially uniform white substrate that use a single constant threshold for detecting edges or use of maximum and minimum thresholds as described in connection with the example of FIG. 5 would result in several edge transitions being detected in the pixel data.

To the end that application of the method does not result in edges being detected on a substrate having substantially uniform gray scale images therein, a pixel variance measurement step may be executed. In a pixel variance measurement step, the pixel value may be analyzed to determine a measurement in pixel variance, such as the difference between the maximum and minimum pixel value, or the difference between the average local minimum value and the average local maximum value. If the pixel variance measurement value does not exceed a predetermined value, then it is determined that the scene is one of a substantially uniform reflectance, and either processing ends or edges that are detected are ignored.

In the example illustrated in FIG. 6, the step of pixel variance measurement is substituted for by a specialized minimum threshold establishing step. Specifically, in the example shown in FIG. 6, minimum threshold 142 is established according to a rule which precludes minimum threshold 142 from being established within a predetermined value from the value of maximum threshold 144 at any given pixel location. Using this threshold establishing step, it is seen that the pixel value 140 never falls below minimum threshold 142, and that therefore no edges are detected. This is the correct result for a substantially uniform gray scale image in which substantially no edges are humanly recognizable.

It has been mentioned that control unit 40, according to the method of the invention, normally analyzes a line of image data at a given time. In the case of a 1D image sensor, there is often only one pixel row from which a line of image data can be determined. However, a 2D image sensor comprises several rows of pixels from which numerous lines of image data can be selected. In a preferred implementation of the invention in a reader having a 2D image sensor control unit 40 applies several lines of image data determined from an initial bit map to an edge detection method in succession. In one embodiment of the invention, control unit 40 applies lines of image data corresponding to a vertical, horizontal, diagonal left, and diagonal right pixel rows to an edge detection method in succession. In another embodiment, control unit 40 applies parallel lines of image data determined from the array to an edge detection method in succession. If application of an edge detection method to any one of the lines of image data yields the detection of an image having a plurality of edge transitions before all lines of image data determined from a given frame are applied to the method, then program control may immediately jump to step 106 to change the mode of operation of the reader without analyzing the remaining lines of image data.

Referring again to the flow diagram of FIG. 3, it is seen that control unit 40 proceeds to block 106 to change the mode of operation of the reader when the control unit determines that a machine readable indicia is in the field of view.

Normally, this change in the reader operating mode will comprise a change in the operation of the reader from a first mode, wherein the reader does not have the capability to recognize machine readable indicia to a second mode wherein the reader actively attempts to recognize machine readable indicia. The second mode of operation may be characterized, for example, by the activation of illumination array 22, and/or by activation of a bar code decoding algorithm and/or an optical character recognition algorithm. When a bar code decoding algorithm is activated, control unit 40 may process a frame of image data to locate image data pertaining to a symbology, determine the identity of that symbology, and apply further decoding steps to the image data corresponding to that symbology to determine the message encoded by the symbol. The second mode of operation may also be characterized by the activation of an optical character recognition (OCR) algorithm. When an optical character recognition algorithm is activated, control unit 40 processes image data from a frame to determine the identity of any text characters or other machine readable image data which may be represented in the frame. If in the second mode of operation, the reader is programmed either to decode a symbol or to perform OCR on other machine readable indicia, then control unit 40 should be configured to execute certain processing steps to determine whether the detected machine readable image data corresponds to a symbol or whether the image data corresponds to non-symbol indicia. Since such processing steps, and specific steps of various decoding and optical character recognition algorithms are well known, they will not be discussed further herein.

While this invention has been described in detail with reference to a preferred embodiment, it should be appreciated that the present invention is not limited to that precise embodiment. Rather, in view of the present disclosure which describes the best mode for practicing the invention, many modifications and variations would present themselves to those skilled in the art without departing from the scope and spirit of this invention, as defined in the following claims.

What is claimed is:

1. A method for operating an optical reading device having an imaging assembly, said method comprising the steps of:
   generating image information from said imaging assembly;
   detecting edge transitions of said image information; and
   changing a mode of operation of said optical reading device if a number of said edge transitions is equal to or exceeds a number of edge transitions previously determined to indicate there being a decodable indicia represented in said image information, wherein said number of edge transitions is at least two edge transitions.

2. The method of claim 1, wherein said detecting step includes the step of analyzing a single line of image information.

3. The method of claim 1, wherein said detecting step includes the steps of:
   capturing a frame of image information;
   sequentially analyzing a plurality of lines of image information from said captured frame; and
   ceasing said detecting step if one of said lines indicates the presence of edge transitions in said image information in excess of said predetermined amount.

4. The method of claim 3, wherein said analyzing step includes the step of sequentially analyzing vertical, horizontal, and diagonal lines of image information.

5. The method of claim 1, wherein said detecting step includes the steps of:
   analyzing a line of image information;
   establishing at least one threshold for said line of image information; and
   recording said edge transitions based on crossings of said image information of said at least one threshold.

6. The method of claim 1, further comprising the step of determining a pixel variance measurement to determine if said image information corresponds to a uniform gray scale image.

7. The method of claim 1, wherein said establishing step includes the step of setting a maximum threshold and a minimum threshold, and wherein said recording step includes the step of counting an edge transition if said image information rises above said maximum threshold or falls below said minimum threshold.

8. The method of claim 1, wherein said establishing step includes the step of setting said thresholds according to a rule which precludes said thresholds from being established within a predetermined range of one another so that edge transitions are not recorded from image information that corresponds to a substantially uniform gray scale scene.

9. A method for detecting for the presence of a machine readable indicia which may be represented in image information, said method comprising the steps of:
   detecting edge transitions represented in said image information;
   counting said edge transitions, and
   determining that a machine readable indicia is represented in said image information if the number said edge transitions is equal to or exceeds a predetermined number, wherein said predetermined number of edge transitions is at least two.

10. The method of claim 9, further including the step of increasing illumination of said indicia if said indicia is determined to be present.

11. The method of claim 9, wherein said detecting step includes the step of analyzing a line of image information.

12. The method of claim 9, wherein said detecting step includes the steps of:
   capturing a frame of image information;
   sequentially analyzing a plurality of lines of image information from said captured frame; and
   ceasing said detecting step if one of said lines of image information indicates the presence of edge transitions in said image information is equal to or in excess of said predetermined number.

13. The method of claim 12, wherein said analyzing step includes the step of sequentially analyzing vertical, horizontal, and diagonal lines of image information.

14. The method of claim 12, when said analyzing step includes the step of sequentially analyzing parallel spaced apart lines of image information.

15. The method of claim 9, wherein said detecting step includes the steps of:
   analyzing a line image information;
   establishing at least one threshold for said line; and
   recording said edge transitions based on crossings of said image information of said at least one threshold.

16. The method of claim 15, further comprising the step of finding a pixel variance measurement to determine if said image information corresponds to a uniform gray scale image.

17. The method of claim 15, wherein said establishing step includes the step of setting a maximum threshold and a minimum threshold, and wherein said recording step includes the step of counting an edge transition if said image information rises above said maximum threshold or falls below said minimum threshold.

18. The method of claim 17, wherein said establishing step includes the step of setting said thresholds according to a rule which precludes said thresholds from being established within a predetermined range of one another so that edge transitions are not recorded from image information that corresponds to a substantially uniform gray scale scene.

19. An optical reading device having an imaging assembly, said optical reading device being adapted to:

generate image information from said imaging assembly;

detect edge transitions of said image information; and change a mode of operation of said optical reading device if a number of said edge transitions is equal to or exceeds a predetermined number of edge transitions, wherein said predetermined number of transitions is at least two.

20. The optical reading device of claim 19, wherein said optical reading device is further adapted to:

capture a frame of image information;

sequentially analyze a plurality of lines of image information from said captured frame; and cease said detection of said edge transitions if one of said lines indicates the presence of edge transitions in said image information is equal to or in excess of said predetermined number of transitions.

21. The optical reading device of claim 20, wherein said reading device in analyzing said image information, sequentially analyzes vertical, horizontal, and diagonal lines of image information.

22. The optical reading device of claim 19, wherein said reading device in detecting said edges:

analyzes a line of image information;

establishes at least one threshold for said line of image information; and records said edge transitions based on crossings of said image information of said at least one threshold.

23. The optical reading device of claim 22, wherein said reading device further determines if said image information corresponds to a uniform gray scale image.

24. The optical reading device of claim 22, wherein said reading device in establishing at least one said threshold sets a maximum threshold and a minimum threshold, and wherein said reading device, in recording said edge transitions, counts an edge transition if said image information rises above said maximum threshold or falls below said minimum threshold.

25. The optical reading device of claim 22, wherein said reading device, in establishing said at least one threshold, sets thresholds according to a rule which precludes threshold from being established within a predetermined range of one another so that edge transitions are not recorded from image information that corresponds to a substantially uniform gray scale scene.

26. An optical reading device having an imaging assembly, said optical reading device being adapted to:

generate image information from said imaging assembly;

detect edge transitions of said image information; and change a mode of operation of said optical reading device if a number of said edge transitions of said image information is at least two, and indicates change in said number of transitions by a predetermined number of transitions.

27. The optical reading device of claim 26, wherein said optical reading device is further adapted to:

capture at least a first frame for determining a equilibrium number of edge transitions;

capture a subsequent frame of image information;

analyze at least one line of image information from said subsequent captured frame; and activate said mode change if said at least one lines indicates that a number of edge transitions in said image information exceeds said equilibrium level by said predetermined amount.

28. The optical reading device of claim 27, wherein said reading device in analyzing said image information, sequentially analyzes vertical, horizontal, and diagonal lines of image information.

29. The optical reading device of claim 26, wherein said reading device in detecting said edges:

analyzes a line of image information;

establishes at least one threshold for said line of image information; and records said edge transitions based on crossings of said image information of said at least one threshold.

30. The optical reading device of claim 29, wherein said reading device in establishing at least one said threshold sets a maximum threshold and a minimum threshold, and wherein said reading device, in recording said edge transitions, counts an edge transition if said image information rises above said maximum threshold or falls below said minimum threshold.

31. The optical reading device of claim 29, wherein said reading device, in establishing said at least one threshold, sets thresholds according to a rule which precludes thresholds from being established within a predetermined range of one another so that edge transitions are not recorded from image information that corresponds to a substantially uniform gray scale scene.

32. The method of claim 1, wherein said method further includes the step of implementing said method using a stationary position optical reading device.

33. The method of claim 1, wherein a mode of operation of said device after said mode change is characterized by at least one of an increase in illumination and activation of a decoding algorithm.

34. The method of claim 1, wherein a mode of operation of said device prior to said mode change is characterized by an illumination array being off, and a mode of operation of said device subsequent to said mode change is characterized by said illumination array being on.

35. The method of claim 2, wherein said line is a straight line of contiguous pixels.

36. The method of claim 3, wherein said plurality of lines are spaced apart.

37. The method of claim 9, wherein said method further includes the step of implementing said method using a stationary position optical reading device.

38. The method of claim 9, wherein said method further includes the step on activity a mode change if said machine readable indicia is determined to be represented in said image information, said mode change characterized by at least one increased illumination, and activation of a decoding algorithm.

39. The method of claim 38, wherein a mode of operation of said device prior to said mode change is characterized by an illumination array being off, and a mode of operation of said device subsequent to said mode change is characterized by said illumination array being on.

40. The method of claim 11, wherein said line is a straight line of contiguous pixels.

41. The method of claim 12, wherein said plurality of lines are spaced apart.

42. The device of claim 19, wherein said device is a stationary position optical reading device.

43. The device of claim 19, wherein said device after said mode change is characterized by at least one of the activation of an illumination array, and activation of a decoding algorithm.

44. The device of claim 19, wherein said device includes an illumination array and wherein a mode of operation of said device prior to said mode change is characterized by an illumination array being off, and a mode of operation of said device subsequent to said mode change is characterized by said illumination array being on.

45. The device of claim 20, wherein said line is a straight line of contiguous pixels.

46. The device of claim 20, wherein said plurality of lines are spaced apart.

47. The device of claim 26, wherein said device is a stationary position optical reading device.

48. The device of claim 26, wherein said mode of operation of said device after said mode change is characterized by at least one of the activation of an illumination array, and activation of a decoding algorithm.

49. The device of claim 26, wherein a mode of operation of said device prior to said mode change is characterized by an illumination array being off, and a mode of operation of said device subsequent to said mode change is characterized by said illumination array being on.

50. The device of claim 29, wherein said line is a straight line of contiguous pixels.

51. The device of claim 26, wherein said device is adapted to plurality of spaced apart lines when detecting said edge transitions.

52. A stationary position, presentation style optical reader, comprising:
   a 2D imaging assembly disposed for generating image data corresponding to a target;
   an illumination assembly;
   a control unit in communication with said imaging assembly and said illumination assembly, adapting said reader to:
      capture a frame of image data;
      analyze at least one line of image data of said frame;
      detect edge transitions in said at least one lie; and
      change a mode of operation of said reader if a number of edge transitions in said line is at least two and if said number of transitions is equal to or exceeds an amount previously determined to indicate there being a decodable indicia intersected by said line, said mode of operation after said mode change characterized by at least one of an increase in an illumination level of said reader and an actuation of a decoding algorithm.

53. The reader of claim 52, wherein said control unit analyzes a plurality of spaced apart lines in said image data.

54. The reader of claim 52, wherein said control unit sequentially analyzes a plurality of spaced apart lines in said images data and ceases said analysis of said lines if one of said lines includes a number of edge transitions indicative of there being decodable indicia intersected by said line.

55. The reader of claim 52, wherein said mode of operation said reader after said mode change is characterized by an increase in an illumination level of said illumination assembly.

56. The reader of claim 52, wherein a mode of operation of said reader said mode change is characterized by an actuation of a decoding algorithm.

57. The reader of claim 52, wherein said control unit in detecting said edge transitions, establishes at least one threshold for said line and records said edge transitions based on crossings of said image information of said at least one threshold.

58. The reader of claim 52, wherein said control unit is further adapted to determine a pixel variance method measurement to determine if said image data corresponds to a uniform gray scale image.

59. The reader of claim 52, wherein said reading device in establishing at least one said threshold sets a maximum threshold and a minimum threshold, and wherein said reading device, in recording said edge transitions, counts an edge transition if said image information rises above said maximum threshold or falls below said minimum threshold.

60. The reader of claim 52, wherein said reading device, in establishing said at least one threshold, sets thresholds according to a rule which precludes threshold from being established within a predetermined range of one another so that edge transitions are not recorded from image information that corresponds to a substantially uniform gray scale scene.

61. The reader of claim 52, wherein said at least one line comprises a straight line of contiguous pixels.

62. A stationary position, presentation style optical reader, comprising:
   an imaging assembly disposed for generating image data corresponding to a scene including a background having a plurality of edges;
   an illumination assembly;
   a control unit in communication with said imaging assembly and said illumination assembly, adapting said reader to:
      capture at least one frame of image data;
      analyze at least one line of image data of said frame to determine an equilibrium level of edge transitions, said equilibrium level of edge transitions indicating a number of edge transitions of said background intersection by said line;
      capture a subsequent frame of image data;
      detect edge transitions in said at least one line from said subsequent frame; and
      change a mode of operation of said reader if a number of edge transitions in said line exceeds said equilibrium level of transitions by an amount previously determined to indicate there being a decodable indicia intersected by said line, said mode of operation after said mode change characterized by at least one of an increase in a illumination level of said reader and an actuation of a decoding algorithm.

63. The reader of claim 62, wherein said control unit analyzes a plurality of spaced apart line in said image data.

64. The reader of claim 62, wherein said control unit sequentially analyzes a plurality of spaced apart lines in said image data and ceases said analysis of said lines if one of said lines includes a number of edge transitions indicative of there being decodable indicia intersected by said line.

65. The reader of claim 62, wherein said mode of said reader after said mode change is characterized by an increase in said illumination level.

66. The reader of claim 62, further characterized by an actuation of a decoding algorithm.

67. The reader of claim 62, wherein said control unit in detecting said edge transitions, establishes at least one threshold for said line and records said edge transitions based on crossings of said image information of said at least one threshold.

68. The reader of claim 62, wherein said control unit is further adapted to determine a pixel variance method measurement to determine if said image data corresponds to a uniform gray scale image.

69. The reader of claim 62, wherein said reading device in establishing at least one said threshold sets a maximum threshold and a minimum threshold, and wherein said reading device, in recording said edge transitions, counts an edge transition if said image information rises above said maximum threshold or falls below said minimum threshold.

70. The reader of claim 62, wherein said reading device, in establishing said at least one threshold, sets thresholds according to a rule which precludes threshold from being established within a predetermined range of one another so that edge transitions are not recorded from image information that corresponds to a substantially uniform gray scale scene.

71. The reader of claim 70, wherein said line comprises a straight line of contiguous pixels.

* * * * *